US006041648A

United States Patent [19]

Angermaier et al.

[11] Patent Number: 6,041,648

[45] Date of Patent: Mar. 28, 2000

[54] METHOD FOR AVOIDING MISDETECTION IN A DIAGNOSIS OF A TANK VENTING SYSTEM FOR A MOTOR VEHICLE

[75] Inventors: Anton Angermaier, Thann; Klaus Bayerle, Regensburg, both of Germany

[73] Assignee: Siemens Aktiengesellschaft, Munich, Germany

[21] Appl. No.: 08/971,489

[22] Filed: Nov. 17, 1997

[30] Foreign Application Priority Data

Nov. 15, 1996 [DE] Germany ........................ 196 47 409

[51] Int. Cl.[7] ........................ G01M 15/00

[52] U.S. Cl. ........................ 73/118.1; 73/117.2

[58] Field of Search ........................ 73/118.1, 35, 40, 73/46, 49.7, 116, 112, 113, 115, 117.2, 117.3, 119 R

[56] References Cited

U.S. PATENT DOCUMENTS

| | | | |
|---|---|---|---|
| 5,369,984 | 12/1994 | Rogers et al. | 73/49.2 R |
| 5,490,414 | 2/1996 | Durschmidt et al. | 73/118.1 |
| 5,509,296 | 4/1996 | Kolb | 73/40.5 R |
| 5,560,243 | 10/1996 | Wild | 73/40.5 R |
| 5,614,665 | 3/1997 | Curran et al. | 73/118.1 |

FOREIGN PATENT DOCUMENTS

| | | |
|---|---|---|
| 41 12 481 A1 | 10/1992 | Germany . |
| 42 03 099 A1 | 8/1993 | Germany . |
| 44 27 688 A1 | 2/1996 | Germany . |

*Primary Examiner*—Eric S. McCall

*Attorney, Agent, or Firm*—Herbert L. Lerner; Laurence A. Greenberg; Werner H. Stemer

[57] ABSTRACT

A method for avoiding misdetection in a diagnosis of a tank venting system for a motor vehicle includes deriving a statement about a fill level of a fuel tank by evaluating a signal of a pressure sensor in the tank venting system. To that end, prior to the diagnosis of the tank venting system, the pressure fluctuations are detected and compared with a threshold value. If the pressure fluctuations exceed the threshold value, then a conclusion is drawn that the fuel tank is full, and the diagnosis is not enabled.

4 Claims, 4 Drawing Sheets

METHOD FOR AVOIDING MISDETECTION IN A DIAGNOSIS OF A TANK VENTING SYSTEM FOR A MOTOR VEHICLE

BACKGROUND OF THE INVENTION

Field of the Invention

The invention relates to a method for avoiding misdetection in a diagnosis of a tank venting system for a motor vehicle driven by an internal combustion engine, which includes delivering a signal corresponding to the pressure in the tank venting system from a pressure sensor to a control unit, and assessing the tank venting system as to its operability on the basis of a pressure course over time.

The goal of such tank venting systems is to prevent hydrocarbons from evaporating out of the fuel tank into the atmosphere.

To that end, the tank venting system generally has a fuel tank and a tank venting valve, which communicates with an intake manifold of the internal combustion engine that drives the motor vehicle. As a result, with the aid of negative pressure in the intake tube, fuel vapors can be aspirated off and delivered for combustion in the engine cylinders. Typically, the volume in the fuel tank located above the fuel is not aspirated off directly. Instead, the fuel vapor as a rule is temporarily stored in a separate container that contains an adsorbing material, which as a rule is an activated charcoal filter. That prevents the fuel vapor from escaping into the environment. The activated charcoal filter adsorbs fuel vapors in periods of time in which no aspiration from the intake tube occurs, for instance when the engine is stopped, or whenever the tank venting valve is kept closed on the basis of the current operating state of the engine.

Since the activated charcoal filter can only store a limited fuel mass, it must be flushed in suitable engine operating ranges. In that process the tank venting valve, which is disposed in a line between the activated charcoal filter and the intake tube of the engine, is opened, by triggering with suitable signals from an electronic control unit of the engine. The opening cross section of the tank venting valve and therefore the flushing flow through the activated charcoal filter can be adjusted by varying the triggering duty cycle of that signal.

There is a risk that such a tank venting system will leak, or that components in the system will not function properly. Such systems are therefore repeatedly checked for operability during motor vehicle operation. One method for checking a tank venting system is described, for instance, in German Published, Non-Prosecuted Patent Application DE 44 27 688 A1, corresponding to U.S. application Ser. No. 08/510,744, filed Aug. 3, 1995. Through the use of that method, the tank venting system is evacuated by the negative pressure prevailing in the engine intake tube, and the system is assessed on the basis of negative pressure buildup and negative pressure reduction gradients.

The course and outcome of the diagnosis of the tank venting system through the use of vacuum processes, whether with the aid of the intake tube negative pressure or through the use of an external vacuum pump, are greatly influenced by the fill level of the fuel tank. When the fuel tank is full, as a rule leaks with smaller cross sections are more easily detected than, for instance, in a tank that is only half full, so that the fill level represents a test condition for the FTP test. The result is undesired diagnostic entries (only leaks with cross sections larger than 1 mm need to be detected) and subsequent demands for assurance that are not actually necessary.

In special variants of tank venting systems, two-way valves are installed between the fuel tank and the activated charcoal filter in order, among other goals, to generate a pressure buildup when the tank is full and thus to force the gas pump nozzle to shut off early enough when the motor vehicle tank is being filled. At that moment, a float valve closes the second connecting hose, which has no valve, between the fuel tank and the activated charcoal filter in order not to cause pressure losses, in what are known as on-board refueling vapor recovery systems (ORVR systems), in which the fuel vapor arising in refueling is carried from the fuel tank into the activated charcoal container through a line. Problems then arise in the diagnosis of the tank venting system when the fuel tank is full to the top, because the two-way valve becomes operative then (pressure loss in generating negative pressure), and the result can be a misdiagnosis. That problem can be solved, for instance, by bypassing the two-way valve with an electrically triggerable bypass valve during the diagnosis of the tank venting system.

SUMMARY OF THE INVENTION

It is accordingly an object of the invention to provide a method for avoiding misdetection in a diagnosis of a tank venting system for a motor vehicle, which overcomes the hereinafore-mentioned disadvantages of the heretofore-known methods of this general type and which provides a simple way of precluding misdetection when the fuel tank is full or nearly full.

With the foregoing and other objects in view there is provided, in accordance with the invention, in a method for avoiding misdetection in a diagnosis of a tank venting system for a motor vehicle driven by an internal combustion engine, which includes supplying a signal corresponding to pressure in the tank venting system from a pressure sensor to a control unit, and evaluating the tank venting system as to its operability on the basis of a course of the pressure over time, the improvement which comprises checking if the engine is in an idling operating state; checking if a speed of the motor vehicle is nearly zero; detecting pressure fluctuations of the pressure signal within a specified period of time; comparing the pressure fluctuations with a predetermined threshold value; concluding that the fuel tank is full if the threshold value is exceeded; and preventing a diagnosis of the tank venting system if it is concluding that the fuel tank is full.

In accordance with another mode of the invention, there is provided a method which comprises experimentally ascertaining the threshold value as a function of a structural form of the fuel tank.

In accordance with a concomitant mode of the invention, there is provided a method which comprises providing as the pressure sensor a differential pressure sensor having a first connection communicating with a venting line leading from the fuel tank to an activated charcoal container and a second connection communicating with the atmosphere.

In the case of a fully filled fuel tank, the law requires no diagnosis of the tank venting system. A statement is therefore derived as to whether or not the fuel tank is full by evaluating the signal of the pressure sensor, which is necessary anyway for diagnosis of the tank venting system. If the tank is full, the diagnosis of the tank venting system is then not enabled. The tank pressure signal is evaluated in such a way that before the onset of diagnosis, the pressure fluctuations when the engine is idling and when the vehicle is stopped are ascertained. If the fuel tank is filled full, then there is a large mass of fuel in the tank, and the remaining air volume in the fuel tank is only very slight. Since the engine introduces vibration through the vehicle body into the tank venting system as well, pressure fluctuations are created in the fuel tank. As the quantity of fuel decreases, the mass drops, the residual volume of air rises, and the pressure fluctuations decrease. A distinction can be made between a full fuel tank and one that is half empty, for instance by comparing these pressure fluctuations with a predetermined threshold value.

Other features which are considered as characteristic for the invention are set forth in the appended claims.

Although the invention is illustrated and described herein as embodied in a method for avoiding misdetection in a diagnosis of a tank venting system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
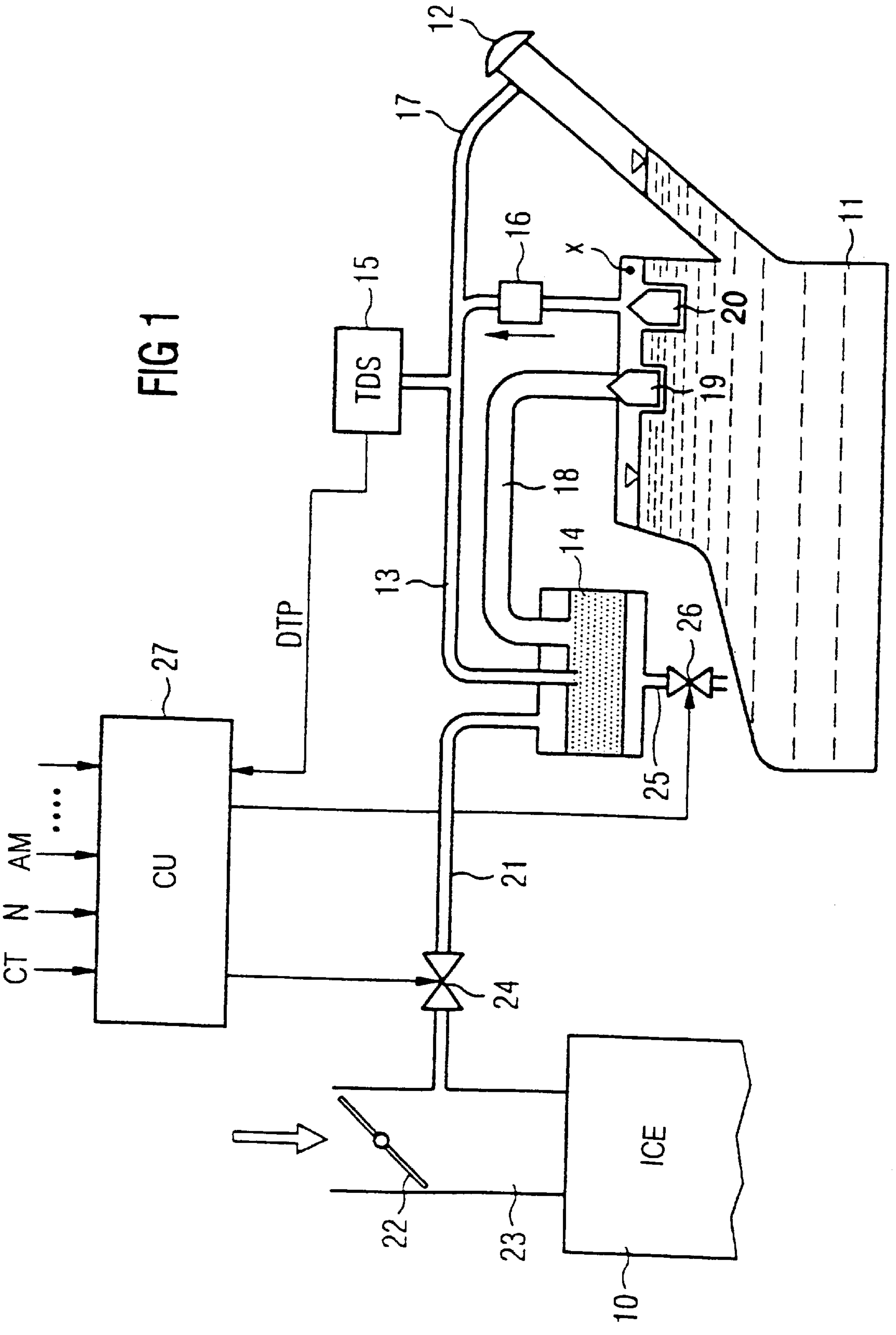
FIG. 1 is a schematic and diagrammatic illustration of a tank venting system for an internal combustion engine having an electronic control unit.

Referring now to the figures of the drawings in detail and first, particularly, to FIG. 1 thereof, there is seen a simplified representation of a tank venting system of a motor vehicle driven by an internal combustion engine 10. The tank venting system has a fuel tank 11 with a fill neck that can be closed in a hermetically sealed manner with a tank cap 12.

The fuel tank 11 communicates through a venting line 13 with an activated charcoal container 14, in which hydrocarbon vapors outgassing from the fuel tank 11 are absorbed. A pressure sensor 15 is provided in the venting line 13 in order to detect the pressure in the fuel tank 11. A differential pressure sensor which may, for instance, be used as the pressure sensor 15, has a first connection that communicates with the venting line 13 and a second connection that communicates with the atmosphere. A two-way valve 16 is also introduced into the venting line 13 and permits a reduced flow of fuel vapors in a direction indicated by an arrow symbol. As a result, with a full fuel tank, it is possible to generate a pressure buildup through the use of residual gas in the fuel tank (volume X) and thus to force a pump nozzle to shutoff early enough during a process of refueling a motor vehicle.

In addition to the venting line 13, the fuel tank 11 also communicates with the activated charcoal container 14 through a refueling venting line 18, which has a larger cross section than the venting line 13. In on-board refueling vapor recovery (ORVR) tank venting systems, this line 18 makes it possible for the fuel vapor emerging at the onset of the refueling operation to flow directly into the activated charcoal container. However, as the fill level of the fuel tank rises, and in particular when the tank is nearly full, this line 18 must be closed again in order to prevent a pressure loss. It is only then that the pump nozzle can be shut off automatically by the pressure generated in the fuel tank. This is accomplished by a combined float and rollover valve 19, which is disposed at an entry point of the line 18.

This assures on one hand that no volatile fuel can reach the activated charcoal container 14 directly, even if the fuel tank 11 is completely filled, for instance, or if the motor vehicle comes to rest on its roof in the event of an accident (rollover). A rollover valve 20 is likewise disposed at the mouth of the venting line 13 into the fuel tank 11.

A diagnosis line 17 branches off in the vicinity of the fill opening of the fill neck of the fuel tank 11 and enters the venting line 13 at a point located between the two-way valve 16 and the pressure sensor 15. With the aid of this diagnosis line 17, it is also possible to detect a missing tank cap 12 in the context of checking for intactness of the tank venting system.

A regeneration line 21 leads from the activated charcoal container 14 into an intake conduit or tube 23 of the engine 10, at a location downstream of a throttle valve 22. An electrical flow control valve 24, which is referred to below as a tank venting valve (TVV), is disposed in the regeneration line 21. An aeration line 25, which is provided on the underside of the activated charcoal container 14, communicates with the ambient air and can be shut off through the use of an electromagnetic activated charcoal filter shutoff valve (ASV), which is simply referred to below as a shutoff valve 26.

The triggering of the two valves 24, 26 is effected by trigger lines shown in the figure, through the use of signals of an electronic control unit 27. This control unit 27 is supplied with an output signal DTP of the pressure sensor. Other control parameters needed to operate the engine 10, such as the rpm N, the coolant temperature CT, the residual oxygen content in the exhaust gas, and the aspirated air mass AM, are detected by suitable sensors and likewise supplied to the control unit 27.

These parameters are then further processed within fixedly specified program routines in such a way that among other things, the load state of the engine 10 is determined, and as needed flushing of the activated charcoal container 14 or a checking routine for the tank venting system can be initiated, as is described, for instance, in German Published, Non-Prosecuted Patent Application DE 44 27 688 A1, corresponding to U.S. application Ser. No. 08/510,744, filed Aug. 3, 1995.

It will now be explained in conjunction with FIGS. 2–4 how misdetection in the tank venting diagnosis can be avoided when the fuel tank is full, by evaluation of the pressure signal.

Figure 2:
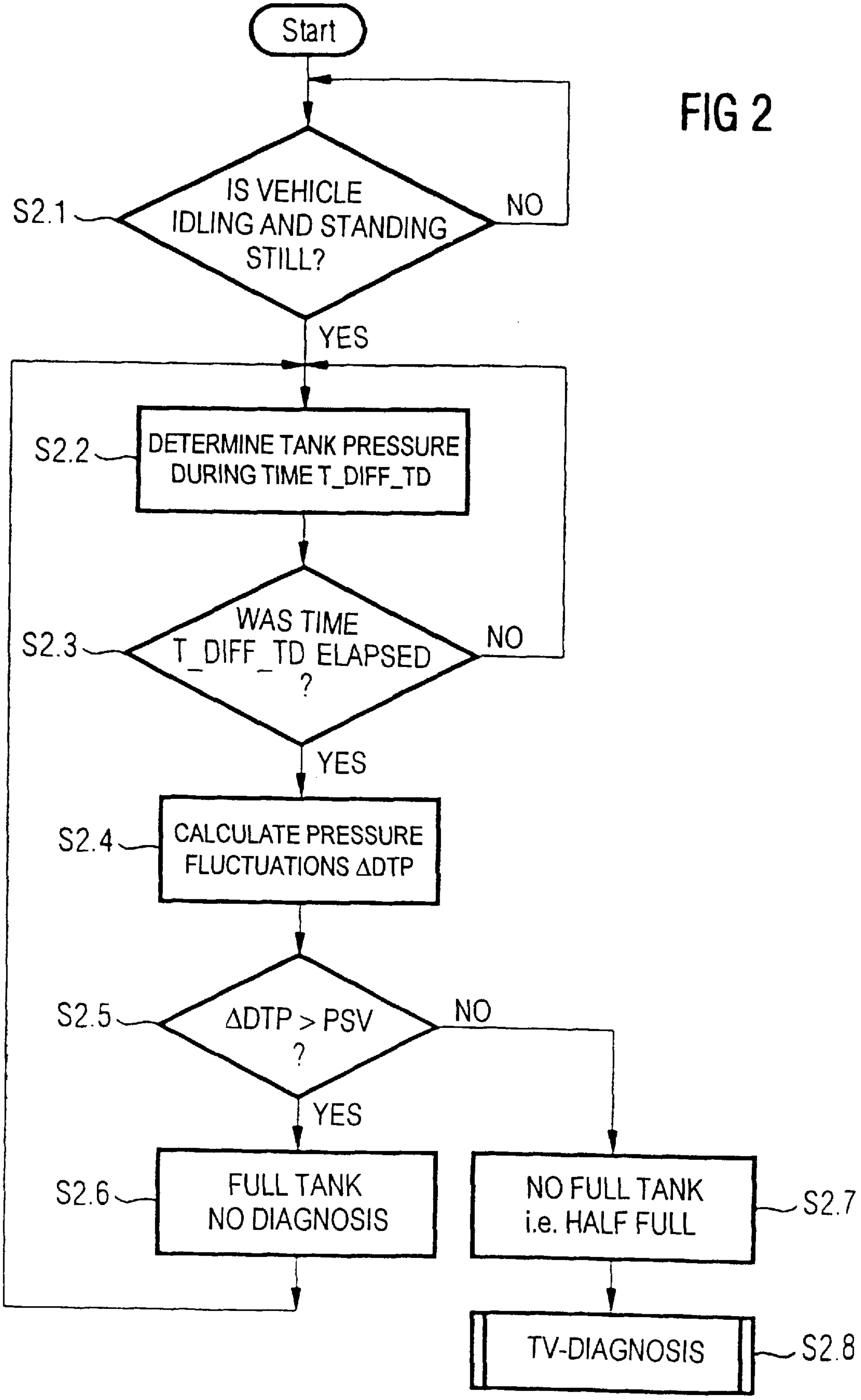
FIG. 2 is a flow chart of a method sequence for determining whether or not a diagnosis of the tank venting system should be performed.

In accordance with the flow chart shown in FIG. 2, after a start, a continuous inquiry is made in a method step S2.1 as to whether or not certain conditions for enabling the tank venting diagnosis are met. Along with a general condition, for instance that there must not be any adaptation of the injection time, a check is performed in particular as to whether or not the engine is in the idling mode and the speed of the motor vehicle is equal to zero. Since speeds of $v=0$ can be detected only at relatively major effort and expense, travel speeds which are greater than zero but are still below a certain limit value (such as 1.8 km/h), are treated as a signal for v=0 and are therefore no guarantee that the vehicle is at an absolute standstill. This repeated inquiry is completed in a waiting loop. If the conditions are met, then the pressure in the fuel tank 11 during a period of time T_DIFF_TD is detected through the use of the pressure sensor 15 in a method step S2.2 and an inquiry is made as to whether or not the time period T_DIFF_TD has elapsed in a method step S2.3. If the time period T_DIFF_TD has elapsed, then pressure fluctuations ΔDTP that have occurred within this time are calculated in a method step S2.4. The maximum and minimum measured pressure values are used to that end. Next, the pressure fluctuations ΔDTP are compared with an applicable threshold value PSV in a method step S2.5. This threshold value is ascertained experimentally as a function of construction data, and in particular the geometry of the fuel tank. The determination is performed on the test bench individually for each type of vehicle.

If the answer to the inquiry in method step S2.5 is that the pressure fluctuations ΔDTP are greater than this threshold value PSV, then a conclusion is drawn in a method step S2.6 that the fuel tank is full, and a diagnosis of the tank venting system is prevented, because misdetection can occur as a result of major pressure fluctuations. A return to method step S2.2 is then made, and the pressure DTP is monitored further.

If the pressure fluctuations ΔDTP do not attain the threshold value PSV, then a conclusion is drawn in a method step S2.7 that the tank fill level (for instance a half-full tank) permits initiating a diagnosis of the tank venting system. A tank venting diagnosis is then to be performed in a method step S2.8. The result of that diagnosis is not adulterated by pressure fluctuations, and no interfering influence of the two-way valve 16 is involved. The method known from German Published, Non-Prosecuted Patent Application DE 44 27 688 A1, corresponding to U.S. application Ser. No. 08/510,744, filed Aug. 3, 1995, or any arbitrary known negative pressure method can, for instance, be used as the diagnosis method.

Figure 3:
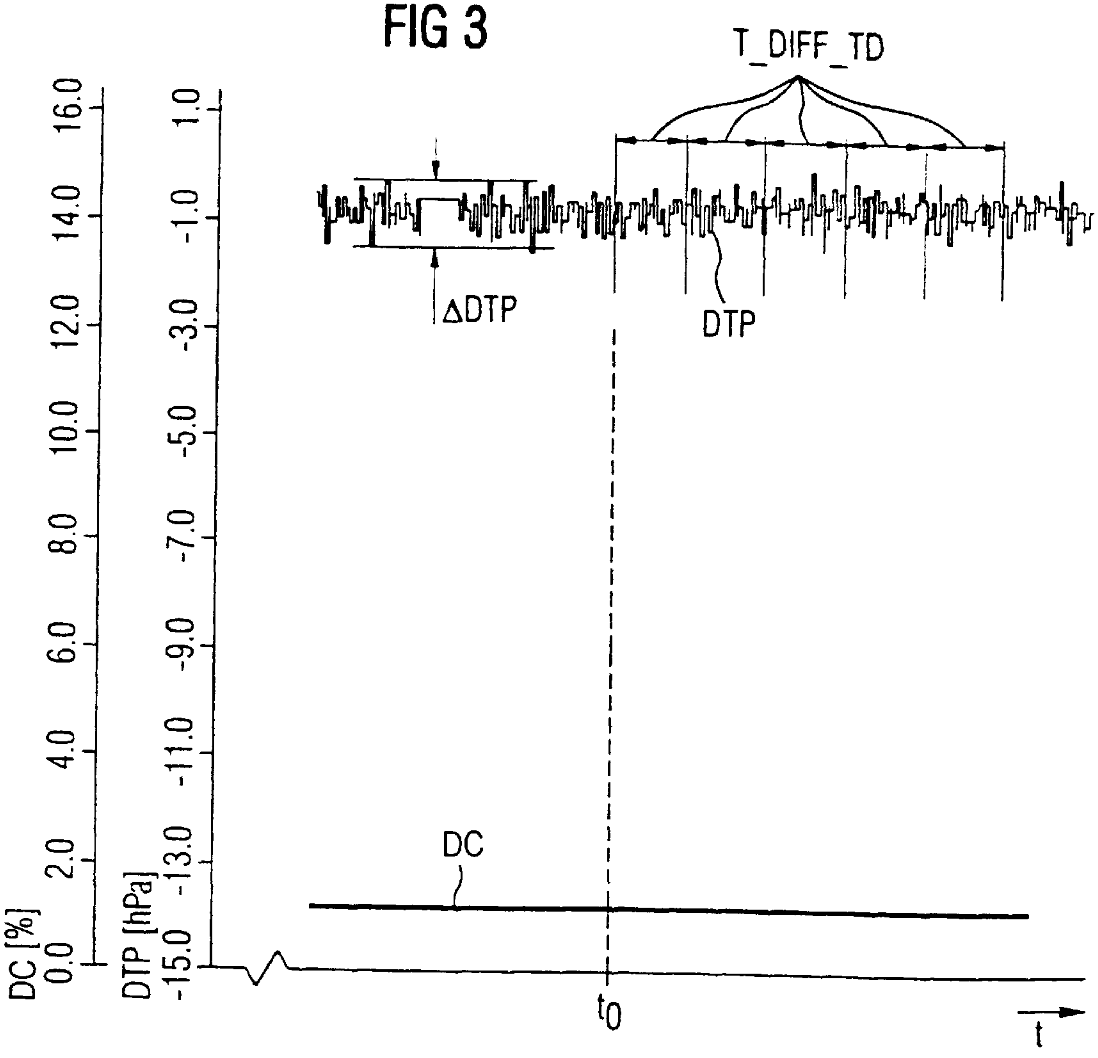
FIG. 3 is a measurement graph used to illustrate pressure fluctuations in the case of a full fuel tank.

FIG. 3 shows the course over time of the tank pressure DTP and of the pressure fluctuations ΔDTP in the tank venting system in a graph for a vehicle with a full fuel tank. The generation of negative pressure for the diagnosis takes place through the intake tube of the engine with the tank venting valve 24 open. A course of a duty cycle DC of the trigger signal for the tank venting valve 24 is plotted in addition to the pressure signal. A flushing mode of the activated charcoal container 14 takes place. To that end, both the tank venting valve 24 and the activated charcoal filter shutoff valve 26 are opened. The duty cycle DC is adjusted as a function of the degree to which the activated charcoal container 14 is filled. At a time $t_0$, the conditions for the diagnosis are met (positive answer to the question in method step S2.1, FIG. 2). If the answer to the question in method step S2.5 is that the pressure fluctuations ΔDTP are above the threshold valve PSV, no diagnosis of the tank venting system is initiated. The checking of the pressure fluctuations as to whether or not they exceed the threshold value continues as long as all of the conditions continue to be met. The flushing mode is then not interrupted.

Figure 4:
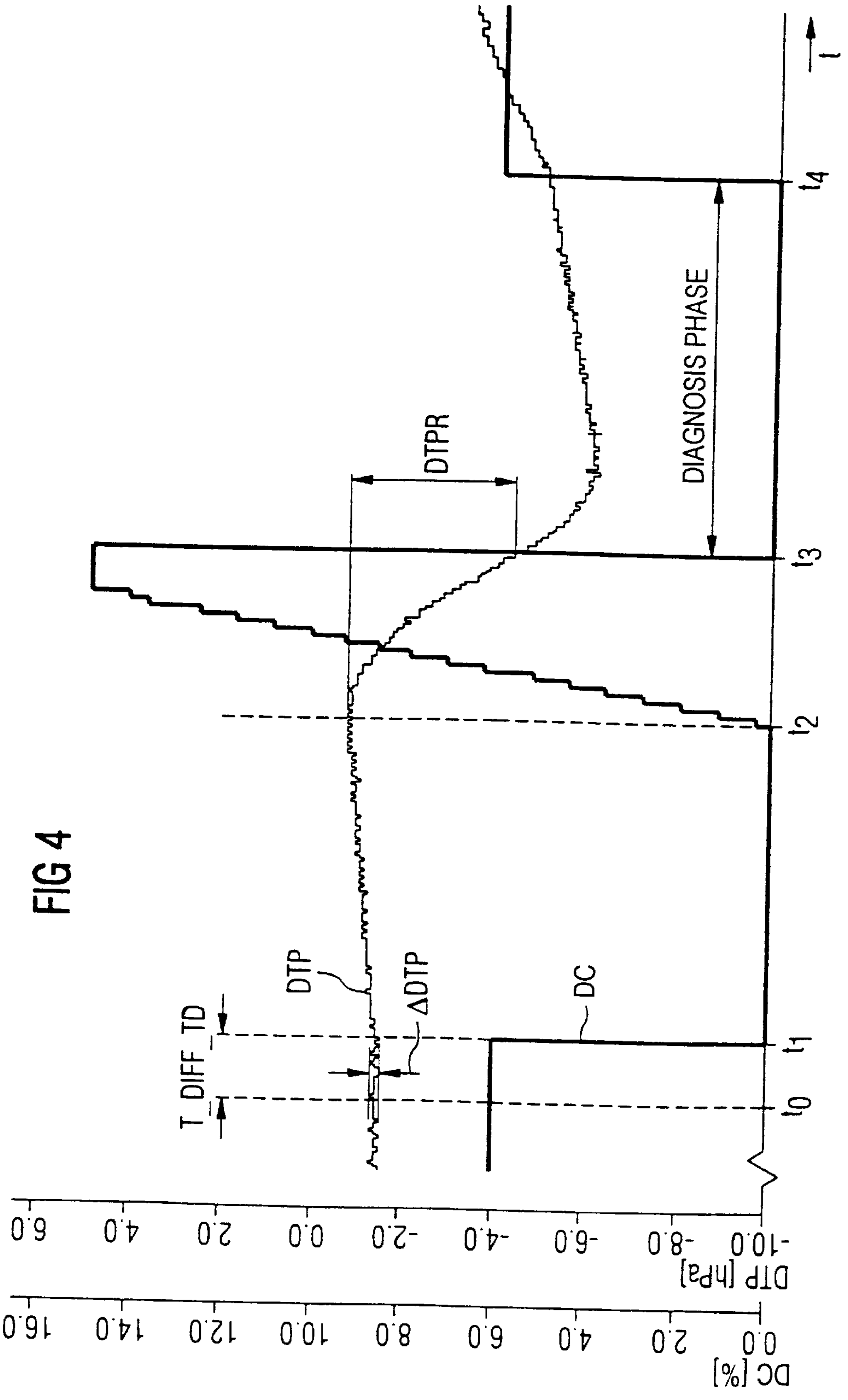
FIG. 4 is a measurement graph used to illustrate pressure fluctuations in the case of a half-full fuel tank.

FIG. 4 shows the pressure conditions as they occur with a fuel tank which is half-full, for instance. At a time $t_0$, the conditions for the diagnosis are met (positive answer to the question in method step S2.1, FIG. 2). If the pressure fluctuations ΔDTP are below the threshold value PSV, then a diagnosis of the tank venting system can be initiated. To that end, at a time $t_1$, the tank venting valve 24 is closed (duty cycle DC=0), and the flushing operation is thus terminated. At a time $t_2$, the activated charcoal filter shutoff valve 26 is closed, and the tank venting valve 24 is opened incrementally by increasing the duty cycle DC. The negative pressure prevailing at this time $t_2$ is a starting value for checking the negative pressure buildup. The negative pressure drops due to the vacuum action of the intake tube. If the negative pressure DTP does not drop by a specified value DTPR within a specified time, then the checking of the tank venting system is discontinued, because no negative pressure, which is required for the testing, can be built up. However, if the value DTPR is attained, then from a time $t_3$ on the diagnosis phase of the tank venting system begins. In other words, a check is performed in a known way as to whether or not the negative pressure is decreasing again within a certain time. Depending on the outcome of the pressure decrease check, the conclusion is drawn either that there is a leak in the tank venting system, or that the system is intact or in other words tight.

At a time $t_4$, the diagnosis phase is concluded, and a flushing operation follows.

We claim:

1. In a method for avoiding misdetection in a diagnosis of a tank venting system for a motor vehicle driven by an internal combustion engine, which includes supplying a signal corresponding to pressure in the tank venting system from a pressure sensor to a control unit, and evaluating an operability of the tank venting system on the basis of a course of the pressure over time, the improvement which comprises:

checking if the engine is in an idling operating state;

checking if a speed of the motor vehicle is below a limit value;

if the engine is in the idling operating state and if the speed of the motor vehicle is below the limit value, detecting pressure fluctuations of the pressure signal within a specified period of time;

comparing the pressure fluctuations with a predetermined threshold value;

concluding that the fuel tank is full if the threshold value is exceeded; and preventing a diagnosis of the tank venting system if a conclusion is reached that the fuel tank is full.

2. The method according to claim 1, which comprises experimentally ascertaining the threshold value as a function of a structural form of the fuel tank.

3. The method according to claim 1, which comprises providing as the pressure sensor a differential pressure sensor having a first connection communicating with a venting line leading from the fuel tank to an activated charcoal container and a second connection communicating with the atmosphere.

4. The method according to claim 1, which comprises detecting pressure fluctuations if the engine is in the idling operating state and if the speed of the motor vehicle is substantially equal to zero.

* * * * *